US010589210B2

(12) United States Patent
Zhou et al.

(10) Patent No.: US 10,589,210 B2
(45) Date of Patent: Mar. 17, 2020

(54) ALUMINOSILICATES AND COATINGS MADE THEREFROM FOR VOC REMOVAL

(71) Applicant: Evonik Operations GmbH, Essen (DE)

(72) Inventors: Mingkang Zhou, Shanghai (CN); Eric G. Lundquist, North Wales, PA (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/538,915

(22) PCT Filed: Dec. 30, 2014

(86) PCT No.: PCT/CN2014/095691
§ 371 (c)(1),
(2) Date: Jun. 22, 2017

(87) PCT Pub. No.: WO2016/106611
PCT Pub. Date: Jul. 7, 2016

(65) Prior Publication Data
US 2017/0341009 A1  Nov. 30, 2017

(51) Int. Cl.
| | | |
|---|---|---|
| B01D 53/04 | (2006.01) | |
| B01D 53/02 | (2006.01) | |
| C09D 7/61 | (2018.01) | |
| C01B 33/26 | (2006.01) | |
| C09D 5/02 | (2006.01) | |
| B01D 53/72 | (2006.01) | |
| B01J 20/32 | (2006.01) | |
| B01D 39/02 | (2006.01) | |
| B01J 20/16 | (2006.01) | |
| B01J 20/28 | (2006.01) | |
| C08K 3/34 | (2006.01) | |
| B01J 20/14 | (2006.01) | |

(52) U.S. Cl.
CPC .............. *B01D 53/04* (2013.01); *B01D 39/02* (2013.01); *B01D 53/02* (2013.01); *B01D 53/72* (2013.01); *B01J 20/16* (2013.01); *B01J 20/28061* (2013.01); *B01J 20/28071* (2013.01); *B01J 20/28073* (2013.01); *B01J 20/28083* (2013.01); *B01J 20/3293* (2013.01); *C01B 33/26* (2013.01); *C09D 5/02* (2013.01); *C09D 7/61* (2018.01); *B01D 2239/0407* (2013.01); *B01D 2239/0492* (2013.01); *B01D 2253/106* (2013.01); *B01D 2253/108* (2013.01); *B01D 2253/306* (2013.01); *B01D 2253/308* (2013.01); *B01D 2253/31* (2013.01); *B01D 2253/311* (2013.01); *B01D 2257/708* (2013.01); *B01D 2258/06* (2013.01); *B01D 2259/4508* (2013.01); *B01J 20/14* (2013.01); *C01P 2006/12* (2013.01); *C01P 2006/14* (2013.01); *C01P 2006/19* (2013.01); *C08K 3/34* (2013.01); *C08K 3/346* (2013.01); *Y02A 50/235* (2018.01)

(58) Field of Classification Search
None
See application file for complete search history.

(56) References Cited

U.S. PATENT DOCUMENTS

| | | | |
|---|---|---|---|
| 3,582,379 A | 6/1971 | Hackbarth et al. | |
| 4,929,431 A | 5/1990 | Hagiwara et al. | |
| 4,933,387 A | 6/1990 | Wason | |
| 5,476,829 A | 12/1995 | Taylor et al. | |
| 5,512,083 A | 4/1996 | Dunne | |
| 5,605,874 A | 2/1997 | Taylor et al. | |
| 5,814,132 A | 9/1998 | Grime et al. | |
| 6,645,271 B2 | 11/2003 | Seguin et al. | |
| 7,288,498 B1* | 10/2007 | Levy ................. | B01D 39/2062 210/660 |
| 2002/0170436 A1 | 11/2002 | Keefer et al. | |
| 2002/0195407 A1* | 12/2002 | Levy ................. | B01D 39/2055 210/767 |
| 2003/0041733 A1 | 3/2003 | Seguin et al. | |
| 2006/0235129 A1 | 10/2006 | Weigl et al. | |
| 2006/0281961 A1 | 12/2006 | Prasad | |
| 2009/0022644 A1 | 1/2009 | Sweredjuk | |
| 2011/0124936 A1* | 5/2011 | Cabiac ................. | B01J 29/06 585/514 |
| 2012/0095128 A1 | 4/2012 | Chakrabarti et al. | |
| 2012/0168380 A1 | 7/2012 | Mendakis | |

(Continued)

FOREIGN PATENT DOCUMENTS

| | | |
|---|---|---|
| CN | 101348628 A | 1/2009 |
| CN | 101940909 A | 1/2011 |

(Continued)

OTHER PUBLICATIONS

Tepe et al., entitled "Smart Coating Technologies to Actively Improve Indoor Air Quality," Dow Coating Materials, Coatings Trends & Technologies 2014, 26 pages.

"Purificatory performance of coatings with air purification," Promulgated by the National Development and Reform Commission of the People's Republic of China, JC/T 1074-2008, 8 pages.

International Search Report and Written Opinion from corresponding International Patent Application No. PCT/CN2014/095691, dated Sep. 25, 2015.

(Continued)

*Primary Examiner* — Tam M Nguyen
(74) *Attorney, Agent, or Firm* — Andrew H. Chung; Linda S. Li; Jason S. Ngui

(57) ABSTRACT

Amorphous aluminosilicates are disclosed, and these amorphous aluminosilicates are characterized by a unique combination of high surface area, low oil absorption, and a significant fraction of the total pore volume resulting from micropores. These amorphous aluminosilicates can be used in various paint and coating applications, with the resultant dried or solid film capable of removing VOC's from the surrounding air.

15 Claims, No Drawings

(56) References Cited

U.S. PATENT DOCUMENTS

| | | | | |
|---|---|---|---|---|
| 2013/0312605 A1* | 11/2013 | Hufen | ............... | B01D 53/0407 95/90 |
| 2015/0202563 A1* | 7/2015 | Spartz | ............... | B01D 53/1412 95/25 |
| 2016/0107114 A1* | 4/2016 | Fu | ..................... | B01D 46/2455 427/245 |
| 2017/0306554 A1* | 10/2017 | Sugiura | ..................... | A61L 9/01 |

FOREIGN PATENT DOCUMENTS

| | | |
|---|---|---|
| CN | 102220054 | 10/2011 |
| CN | 103059679 A | 4/2013 |
| CN | 102220056 | 8/2013 |
| CN | 103469987 A | 12/2013 |
| DE | 10032687 | 1/2002 |
| JP | 8-26718 A | 1/1996 |
| JP | 2000095979 | 4/2000 |
| JP | 2000262844 A | 9/2000 |
| JP | 2000351915 A | 12/2000 |
| JP | 2006159119 A | 6/2006 |
| JP | 3955112 | 8/2007 |
| JP | 2014515766 A | 7/2014 |
| JP | 2018172238 A * | 11/2018 |
| KR | 100802255 | 2/2008 |
| KR | 100951918 | 4/2010 |
| KR | 20110096777 | 8/2011 |
| KR | 20120108186 | 10/2012 |
| KR | 101257488 | 5/2013 |
| WO | WO 2016/106611 | 7/2016 |

OTHER PUBLICATIONS

European Search Report dated Aug. 29, 2018 corresponding to European Application No. 14909421.1 filed Dec. 30, 2014 (12 pages).

Akrochem Corporation; Mineral Fillers—Additional Fillers: Zeolex; XP055499228, Apr. 26, 2009; Retrieved from the Internet on Aug. 13, 2018; URL: https://www.stobec.com/data/produit/1290~v~data_7928.pdf (1 pages).

Paul Doll, et al; Improving Indoor Air Quality with Functional Coatings; Indoor Air Quality: A Brief History; Jun. 25, 2014; XP055499040; Retrieved from the Internet on Aug. 10, 2018, URL: http://storage.dow.com.edgesuite.net/DCM/pdf/Improving-Indoor-Air-Quality_CoatingsTech_April2014.pdf (7 pages).

* cited by examiner

— 1 —

ALUMINOSILICATES AND COATINGS MADE THEREFROM FOR VOC REMOVAL

REFERENCE TO RELATED APPLICATION

This application is a National Stage Application of International Patent Application No. PCT/CN2014/095691, filed 30 Dec. 2014, which is incorporated herein by reference in its entirety. To the extent appropriate, a claim of priority is made to the above disclosed application.

BACKGROUND OF THE INVENTION

Synthetic amorphous sodium aluminosilicates have commonly been used in paints, coatings, and other applications as extender pigments. For example, sodium aluminosilicate commercial products such as Zeolex® 323 and Zeolex® 330 provide excellent opacity, whiteness, brightness, flatting, and scrub resistance for interior architectural formulations. Typically, aluminosilicates used in these applications are used at levels between 2% and 10%. Recently, there have been growing concerns about the levels of volatile organic compounds (VOC's) in indoor air, as well as potential health effects associated with these compounds. In fact, the US EPA has noted a 2 to 5 fold increase in indoor air VOC's, as compared to outdoor air, due to building construction advances that focus on energy conservation and sealing a building from air leaks. Unfortunately, there are many sources of indoor VOC's and these include furniture, carpets, and other floor coverings, as well as other building materials such as insulation and household items. The major VOC's found in indoor air include aldehydes (e.g., formaldehyde) and toluene. Due to concerns over these indoor VOC's, products designed to remove such contaminants have been developed. These include paints and coatings containing agents that either react or adsorb VOC's to remove them from the air. Molecular sieves, such as crystalline aluminosilicate zeolites, have been evaluated in similar applications, and while not wishing to be bound by theory, Applicant believes that these materials may perform poorly due to their crystallinity and lack of larger transport pores (meso and macropores), which may be important in VOC removal. Additionally, such crystalline materials do not function as $TiO_2$ extenders or improve opacity, and can destabilize coating formulations.

In sum, it would be beneficial for the paint or coating used on an indoor surface, and the amorphous aluminosilicates contained therein, to reduce or abate the VOC level by absorption of certain VOC's present in the air or indoor environment. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Amorphous aluminosilicate particles are disclosed and described herein. In accordance with various aspects of this invention, such amorphous aluminosilicate particles can be characterized by (i) a BET surface area in a range from about 120 to about 450 $m^2/g$, (ii) an oil absorption of less than or equal to about 150 cc/100 g, (iii) a pore volume in a range from about 0.18 to about 0.6 cc/g, and (iv) a micropore volume of pores with pore diameters of less than 50 Å that is from about 10% to about 80% of the pore volume.

Coating compositions, such as paint formulations, containing the amorphous aluminosilicate particles also are provided herein. One such coating composition can comprise a binder, a liquid, and the amorphous aluminosilicate particles disclosed herein. Unexpectedly, the resultant dry coatings containing the amorphous aluminosilicate particles can remove volatile organic compounds (VOC's) from the surrounding air or environment.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a coating composition consistent with aspects of the present invention can comprise; alternatively, can consist essentially of; or alternatively, can consist of: (1) amorphous aluminosilicate particles, (2) a binder, and (3) a liquid.

The terms "a," "an," and "the" are intended to include plural alternatives, e.g., at least one, unless otherwise specified.

Generally, groups of elements are indicated using the numbering scheme indicated in the version of the periodic table of elements published in Chemical and *Engineering News*, 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, or otherwise contacted or combined in some other manner or by any suitable method. The materials or components can be contacted together in any order, in any manner, and for any length of time, unless otherwise specified.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicant discloses several types of ranges in the present invention. When Applicant discloses or claims a range of any type, Applicant's intent is to disclose or claim individually each possible number that such a range could reasonably encompass, including end points of the range as well as any sub-ranges and combinations of sub-ranges encompassed therein. As a representative example, the BET surface area of the amorphous aluminosilicate particles can be in certain ranges in various aspects of this invention. By a disclosure that the BET surface area can be in a range from about 125 to about 225 $m^2/g$, Applicant intends to recite that the surface area can be any surface area within the range and, for example, can be equal to about 125, about 130, about 140, about 150, about 160, about 170, about 180, about 190, about 200, about 210, about 220, or about 225 $m^2/g$. Additionally, the surface area can be within any range from about 125 to about 225 $m^2/g$ (for example, from about 125 to about 200 $m^2/g$), and this also includes any combination of ranges between about 125 and about 225 $m^2/g$ (for example, the surface area can be in a range from 125 to about 150 $m^2/g$ or from about 175 to about 215 $m^2/g$). Likewise, all other ranges disclosed herein should be interpreted in a manner similar to this example.

DETAILED DESCRIPTION OF THE INVENTION

Disclosed herein are amorphous aluminosilicate particles, methods for producing amorphous aluminosilicate particles, and paints and coatings and other articles of manufacture using the amorphous aluminosilicate particles.

Unexpectedly, Applicant has found that the amorphous aluminosilicate particles, as disclosed and described herein, can be used in paints or coatings or other articles of manufacture to absorb and/or remove harmful VOC's (e.g., formaldehyde, hydrocarbons) from the surrounding air or atmosphere, for instance, to improve the quality of indoor air. Also unexpectedly, Applicant has found that these beneficial properties can be achieved by using amorphous aluminosilicate particles characterized by high surface area, low oil absorption, and specific pore volume and micropore volume characteristics.

Amorphous Aluminosilicate Particles

Consistent with aspects of the present invention, amorphous aluminosilicate particles can have the following characteristics: (i) a BET surface area in a range from about 120 to about 450 $m^2/g$, (ii) an oil absorption of less than or equal to about 150 cc/100 g, (iii) a pore volume in a range from about 0.18 to about 0.6 cc/g, and (iv) a micropore volume of pores with pore diameters of less than 50 Å that is from about 10% to about 80% of the pore volume. In further aspects, aluminosilicate particles consistent with the present invention also can have any of the characteristics or properties provided hereinbelow, and in any combination.

In an aspect, the aluminosilicate particles can have a relatively high surface area. Often, the BET surface area can fall within a range from about 120 to about 400, from about 120 to about 350, or from about 120 to about 250 $m^2/g$. In further aspects, the BET surface area can be in a range from about 125 to about 425, from about 125 to about 375, from about 125 to about 350, from about 250 to about 400, or from about 250 to about 375 $m^2/g$, and the like. Other appropriate ranges for the BET surface area are readily apparent from this disclosure.

In an aspect, the aluminosilicate particles can have a relatively low oil absorption. For instance, the oil absorption can be in a range from about 30 to about 150 cc/100 g. Alternatively, the oil absorption can be in a range from about 50 to about 150 cc/100 g; alternatively, from about 40 to about 100 cc/100 g; alternatively, from about 50 to about 100 cc/100 g; alternatively, from about 30 to about 90 cc/100 g; alternatively, from about 40 to about 125 cc/100 g; or alternatively, from about 45 to about 85 cc/100 g. Other appropriate ranges for the oil absorption are readily apparent from this disclosure.

The pore volume of the aluminosilicate particles is not particularly limited. However, the pore volume (i.e., the total pore volume, irrespective of pore diameters) often can fall within a range from about 0.18 to about 0.6 cc/g, such as, for instance, from about 0.2 to about 0.6, from about 0.2 to about 0.5, from about 0.2 to about 0.4, from about 0.18 to about 0.4, from about 0.2 to about 0.35, from about 0.18 to about 0.38, or from about 0.2 to about 0.3 cc/g, and the like. Other appropriate ranges for the pore volume are readily apparent from this disclosure.

In an aspect, the aluminosilicate particles can have a relatively large micropore fraction, i.e., the fraction of the pore volume resulting from pores having pore diameters of less than 50 Å. In one aspect, the micropore volume of pores having diameters of less than 50 Å can be from about 10% to about 80%, or from about 10% to about 70%, of the pore volume (i.e., the total pore volume). In another aspect, the micropore volume can be in a range from about 10% to about 60%, or from about 15% to about 60%, of the pore volume. In yet another aspect, the micropore volume can be in a range from about 15% to about 75%, or from about 15% to about 65%, of the pore volume. In still another aspect, the micropore volume can be in a range about 20% to about 70%, or from about 20% to about 60%, of the pore volume. Other appropriate ranges for the fraction of the pore volume resulting from micropores having pore diameters of less than 50 Å are readily apparent from this disclosure.

In an aspect, the aluminosilicate particles can have a CTAB surface area that falls within a range from about 30 to about 110, from about 30 to about 105, or from about 30 to about 100 $m^2/g$. In further aspects, the CTAB surface area can be in a range from about 35 to about 110, from about 35 to about 105, from about 40 to about 110, from about 40 to about 105, or from about 45 to about 110 $m^2/g$, and the like. Other appropriate ranges for the CTAB surface area are readily apparent from this disclosure.

The aluminosilicate particles, in one aspect, can comprise alkali metal aluminosilicate particles. In another aspect, the aluminosilicate particles can comprise sodium aluminosilicate particles. In yet another aspect, the aluminosilicate particles can comprise alkaline earth metal-modified alkali metal aluminosilicate particles. In still another aspect, the aluminosilicate particles can comprise sodium magnesium aluminosilicate particles. Moreover, mixtures or combinations of aluminosilicate particles can be employed, such as a mixture or combination of alkali metal aluminosilicate particles (e.g., sodium aluminosilicates) and alkaline earth metal-modified alkali metal aluminosilicate particles (e.g., sodium magnesium aluminosilicates).

In these and other aspects, the aluminosilicate particles (e.g., alkali metal aluminosilicates and/or alkaline earth metal-modified alkali metal aluminosilicates) are amorphous, and can be synthetic. Thus, the amorphous aluminosilicate particles can be synthetic amorphous aluminosilicate particles.

Synthetic alkali metal silicates, such as sodium aluminosilicates, are generally produced by the reaction of alum with alkali metal silicates. The resulting product usually has a silica to alumina molar ratio of about 11. Amorphous products of this type are known. For example, amorphous products of this type are sold by the J. M. Huber Corporation under the trademark ZEOLEX®. Specific examples of these general products, as well as methods of their preparation, are disclosed in U.S. Pat. Nos. 2,739,073, 2,843,346, and 3,582,379, incorporated herein by reference in their entirety.

After formation, the aluminosilicates can be wet milled (e.g., bead milled), and/or dry milled (e.g., hammer milled), and/or dried (e.g., spray dried), as desired for the particular end-use application, as would be recognized by those of skill in the art.

Compositions and Articles Using Amorphous Aluminosilicates

This invention is also directed to and encompasses any compositions, formulations, and articles of manufacture that contain any of the amorphous aluminosilicate particles disclosed herein (and their respective characteristics or features, such as surface area, oil absorption, pore volume, and micropore volume). Thus, a composition in one aspect of this invention can comprise a liquid and the amorphous aluminosilicate particles disclosed herein. This "liquid" can be any compound which, as a pure compound, is a liquid (not a solid or gas) at standard temperature (25° C.) and pressure (1 atm). Liquids also may be referred to herein as diluents. Water is an illustrative liquid or diluent contemplated herein, as are many organic solvents (e.g., aliphatic hydrocarbons, aromatic hydrocarbons, etc.), as would be recognized by those of skill in the art.

In accordance with this invention, coating compositions (inclusive of paint formulations) are provided, and in particular aspects, these compositions can comprise a binder (often may be referred to as a vehicle; examples include latex resins, for instance, acrylic, vinyl acrylic (polyvinyl acetate), or styreneated acrylic, polyurethane dispersions, solution polymer dispersions, and the like, as well as combinations thereof), a liquid (e.g., water or an organic solvent), and any of the amorphous aluminosilicate particles disclosed herein. Optionally, various additives can be present in the coating composition (inclusive of a paint formulation), dependent upon the desired properties.

Paint formulations typically contain four primary ingredients, namely pigment, binder, liquid, and additives. Any or all of these ingredients may be a single component or may comprise multiple components. The pigment can provide color to the paint and also make the paint opaque, and the pigment is usually of mineral or organic origin, although some pigments are artificially produced. Some pigments possess little or no bulk and must be fixed on a more solid, but at the same time transparent, substance or base. "Prime" pigments provide color and opacity (opaque coverage). The most common prime pigment is titanium dioxide, which is white and is used in latex and oil-based paints.

Traditionally, pigments also provide added hiding properties to the paint. Specialty or extender pigments also may be used and provide bulk to the paint at a low cost. The extender pigments are often chosen for their impact on properties like scrub resistance, stain resistance, and chalk resistance. Alum or clay is frequently used for this purpose. These pigments are added to the paint to provide certain characteristics such as thickness, and a certain level of gloss and durability. They are usually naturally-occurring products which are mined and purified for use in the paint formulation. For example, pigments such as calcium carbonate, talc, and clay are used extensively in paint formulations.

The binder holds the pigment and also adheres it to a surface, and a binder composition may have more than one component. In latex paint, the latex resin often can be the binder. Most commonly in latex paint, the binder can be 100% acrylic, vinyl acrylic (polyvinyl acetate), or styreneated acrylic. The pigment particles generally are insoluble and form a suspension in the binder. The binder "binds" the pigment into a tough, continuous film when dry, and as noted above, helps the paint adhere to the desired surface. In addition, it has been found previously that the use of 100% acrylic binder provides for maximum adhesion when wet, and also provides for resistance to blistering and peeling, resistance to mildew and dirt, and alkali resistance for paint applied over fresh masonry.

Liquids carry the pigment and binder, and this liquid is the part of the paint formulation which evaporates. The role of the liquid is to keep the paint formulation in a fluid form for ease of application. Once applied to the surface, the liquid evaporates, leaving a uniform film which then dries to form a protective coating. Suitable liquids can be determined by the solubility of the binder. In oil-based and alkyd paints, the liquid typically can be a paint thinner, and in latex paints, the liquid generally is water. Traditionally, higher quality paints have less liquid and more solids (i.e., pigment and binder) as measured by percent solids.

Additives are ingredients used at low levels to provide key properties, including but not limited to, mildew resistance, better flow and leveling, and splatter resistance. Common additives used in conventional paint formulations include rheology modifiers, surfactants, defoamers, coalescents, and biocides. Other numerous additives are well-known in the art and may be utilized as required to formulate a paint having the desired properties.

Various techniques are known in the art for producing paint formulations having various types of sheens, i.e., "shine" or gloss. For example, by incrementally increasing pigment levels and/or by using larger pigment particles, various gloss levels can be achieved including, but not limited to, flat, satin, and semi-gloss. Pigment volume concentration (PVC) is often associated with the paint finish, although various finishes may have overlapping ranges of PVC. PVC is the unit volume of pigment as a percentage of the volume of pigment plus the volume of the binder. PVC can represent a relationship between the durability of the coating/paint and the amount of pigment.

Coating compositions (inclusive of paint formulations) of this invention can contain, inter alia, a binder, a liquid, and the amorphous aluminosilicate particles disclosed herein. Surprisingly, such compositions can remove VOC's from the surrounding air or environment and/or reduce the VOC level in the surrounding air or environment. Thus, certain aspects of this invention are directed to coating compositions (inclusive of paint formulations) with VOC abatement capability (e.g., formaldehyde abating, volatile hydrocarbon abating). A standard test used to measure the removal/abatement of certain compounds representative of VOC's is China JC/T 1074-2008 (Purificatory performance of coatings with air purification), incorporated herein by reference in its entirety. In an aspect of this invention, the disclosed coating compositions can pass the China JC/T 1074-2008 standard test for purification efficiency (e.g., removal) of formaldehyde at a level of ≥75%. Additionally or alternatively, the coating composition can pass the China JC/T 1074-2008 standard test for persistence of purification efficiency (e.g., durability, retention) of formaldehyde at a level of ≥60%. Additionally or alternatively, the coating composition can pass the China JC/T 1074-2008 standard test for purification efficiency of toluene at a level of ≥35%. Additionally or alternatively, the coating composition can pass the China JC/T 1074-2008 standard test for persistence of purification efficiency of toluene at a level of ≥20%.

Also encompassed herein are dry coatings (e.g., after drying or curing to form solid or cured films or layers) comprising the amorphous aluminosilicate particles disclosed herein. Moreover, also encompassed herein are dry coatings (e.g., after drying or curing to form solid or cured films or layers) produced from compositions (e.g., wet coating compositions, such as paint formulations) containing the amorphous aluminosilicate particles disclosed herein. The dry coatings in accordance with the present invention typically can have a thickness between about 1 and about 500 μm, depending upon the end-use application, the targeted substrate, the expected environmental conditions, and so forth. For example, the coating can have a thickness in a range from about 5 to about 300 μm, from about 25 to about 250 μm, or from about 35 to about 200 μm.

Unexpectedly, the dry coatings disclosed and described herein can remove VOC's from the surrounding air or environment and/or reduce the VOC level in the surrounding air or environment. A standard test used to measure the removal/abatement of certain compounds representative of VOC's is the China JC/T 1074-2008 test. In an aspect of this invention, the disclosed coatings can pass the China JC/T 1074-2008 standard test for purification efficiency of formaldehyde at a level of ≥75%. Additionally or alternatively, the coatings can pass the China JC/T 1074-2008 standard test for persistence of purification efficiency of formaldehyde at a level of ≥60%. Additionally or alternatively, the coatings can pass the China JC/T 1074-2008 standard test for purification efficiency of toluene at a level of ≥35%. Additionally or alternatively, the coatings can pass the China JC/T 1074-2008 standard test for persistence of purification efficiency of toluene at a level of ≥20%.

Also encompassed herein are articles of manufacture, which can comprise a substrate at least partially covered with any of the amorphous aluminosilicate particles disclosed herein. Moreover, also encompassed herein are articles of manufacture, which can comprise a substrate at least partially covered with a coating, e.g., produced from any of the compositions containing any of the amorphous aluminosilicate particles disclosed herein. Accordingly, coated substrates that comprise a substrate at least partially covered with the aluminosilicate particles described herein, or at least partially covered with the coatings (inclusive of paints) containing aluminosilicate particles described herein, are also within the scope of this invention. Generally, substrates that can be employed in this invention can comprise metal, concrete, wood, paper, or plastic, as well as combinations thereof.

While not being limited thereto, the article of manufacture can be any suitable article, and this can include a filter fiber or air filter; a carpet fiber or carpet; a wall, floor, or ceiling of a building (e.g., an indoor surface at least partially covered); and the like.

This invention also discloses methods of coating a substrate, or for producing a coated substrate. One such method can comprise (a) providing a coating composition comprising a binder, a liquid (e.g., water), and the amorphous aluminosilicate particles disclosed herein; (b) applying the composition to a surface of the substrate; and (c) drying or curing the composition onto the substrate, thereby producing a coated substrate. Coating compositions (or paint formulations) can be applied to the substrate by a variety of techniques, including, for example, dipping, rolling, brushing, spraying, squeeging, backrolling, pouring, troweling, and the like. Combinations of these techniques also can be used. The coating composition can be used on both interior and exterior surfaces of substrates, if desired.

Methods of removing VOC's are contemplated, for instance, to improve air quality. One such method is directed to a method of removing VOC's from an air stream, and this method can comprise passing the air stream through a filter, the filter comprising fibers at least partially covered with the amorphous aluminosilicate particles disclosed herein (or at least partially covered with a coating disclosed herein) under conditions sufficient for at least a portion of the VOC's to contact the fibers and be entrained by the filter, thereby removing VOC's from the air stream. As those of skill in the art would readily recognize, the conditions employed can vary depending on numerous factors, such as the amount of fibers in the filter, the coating/particle thickness, the air stream flow rate and contact time with the fibers, the incoming amount of VOC's, and the desired level of VOC removal, amongst other factors.

Another method is directed to a method of removing VOC's from an indoor environment. This method can comprise (1) providing an interior surface at least partially covered with a coating disclosed herein, and (2) contacting the VOC's with the interior surface, wherein at least a portion of the VOC's in the indoor environment are absorbed by the coating. As those of skill in the art would readily recognize, the amount of the VOC's absorbed by the coating can vary depending on numerous factors, such as the coating thickness, the contact time of the air with the coated interior surface, the amount of air circulation in the indoor environment, the initial amount of VOC's in the indoor environment, and the surface area of the coating as compared to the volume of the indoor environment, amongst other factors.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

The BET surface areas, pore volumes and pore size distributions disclosed herein were determined on a Micromeritics TriStar II 3020 V1.03 using, respectively, the BET nitrogen adsorption method of Brunaur et al., J. Am. Chem. Soc., 60, 309 (1938), and Bill Desorption isotherms with a Halsey Faas Correction, Halsey, G. D., *J. Chem. Phys.* (1948), 16, pp. 931, and such techniques are well known to those skilled in the art.

The CTAB surface area was determined by absorption of CTAB (cetyltrimethylammonium bromide) on the silicate surface, the excess separated by centrifugation and the quantity determined by titration with sodium lauryl sulfate using a surfactant electrode. Specifically, about 0.5 g of the silicate was placed in a 250-mL beaker with 100 mL CTAB solution (5.5 g/L), mixed on an electric stir plate for 1 hour, then centrifuged for 30 min at 10,000 rpm. One mL of 10% Triton X-100 was added to 5 mL of the clear supernatant in a 100-mL beaker. The pH was adjusted to 3-3.5 with 0.1 N HCl and the specimen was titrated with 0.01 M sodium lauryl sulfate using a surfactant electrode (Brinkmann SUR1501-DL) to determine the endpoint.

Oil absorption values were determined in accordance with the rub-out method described in ASTM D281 using linseed oil (cc oil absorbed per 100 g of the particles). Generally, a higher oil absorption level indicates a higher structure particle, while a lower value typically indicates a lower structure particle.

Examples 1-10

Example 1 was an amorphous sodium aluminosilicate commercially-available from J. M. Huber Corporation, and Example 2 was a diatomaceous earth commercially-available from Imerys. Both materials are typically used in paint applications. The sodium aluminosilicates of Example 3-6 were prepared as described in U.S. Pat. No. 3,582,379, incorporated herein by reference in its entirety, with adjustments in reaction temperature to increase the amount of microporosity.

Table I summarizes certain properties and characteristics of the aluminosilicates of Examples 1 and 3-6 and the diatomaceous earth sample of Example 2. Of particular note, Example 3 had a higher BET surface area, lower oil absorption, and about 25% of the pore volume resulted from pores having pore diameters less than 50 Å, as compared to that of Examples 1-2. Examples 4-6, as compared to Example 3, had higher surface area, lower oil absorption, lower pore volume, and higher percentages of micropore volume.

Table II lists the standard 45 PVC (pigment volume concentration) model (control) paint formulation used to evaluate the materials of Examples 1-3, by replacing 5% of the CaCO$_3$ in the formulation (CaCO$_3$ loading was reduced accordingly, from 15% to 10%), and Table III summarizes VOC abatement testing of the paint formulations of Examples 7-10 in accordance with the China JC/T 1074-2008 standards. Unexpectedly, Table III demonstrates that Example 10 (utilizing the aluminosilicate of Example 3) outperformed the other examples in every VOC abatement category tested. Moreover, Example 10 (utilizing the aluminosilicate of Example 3) passed the China JC/T 1074-2008 standard test for purification efficiency of formaldehyde at a level of ≥75%, passed the China JC/T 1074-2008 standard test for persistence of purification efficiency of formaldehyde at a level of ≥60%, passed the China JC/T 1074-2008 standard test for purification efficiency of toluene at a level of ≥35%, and passed the China JC/T 1074-2008 standard test for persistence of purification efficiency of toluene at a level of ≥20%.

Due to the higher surface area, lower oil absorption, and higher percentages of micropore volume of Examples 4-6, as compared to Example 3, it would be expected that coatings made from Examples 4-6 would perform even better in VOC removal than that of Example 10.

TABLE I

Examples 1-6.

| | Example | | | | | |
|---|---|---|---|---|---|---|
| | 1 | 2 | 3 | 4 | 5 | 6 |
| BET Surface Area (m$^2$/g) | 70 | 1.6 | 130 | 342 | 375 | 256 |
| CTAB Surface Area (m$^2$/g) | 73 | — | 50 | 91 | 106 | 96 |
| Oil Absorption (cc/100 g) | 113 | 135 | 79 | 60 | 52 | 59 |
| Pore Volume (cc/g) | 0.291 | 0.002 | 0.279 | 0.233 | 0.246 | 0.196 |
| Micropore Volume (pore diameter <50 Å; % of Pore Volume) | 2.9% | 1.7% | 25.6% | 50% | 54% | 38% |

TABLE II

Paint Formulation.

| Ingredients | Material Description | Wt. % |
|---|---|---|
| Pigment Grind | | |
| Water | | 14.5 |
| 250 HBR | Thickener | 0.1 |
| AMP-95 | Surfactant | 0.2 |
| PG | Solvent | 1.0 |
| TH-100 | Defoamer | 0.2 |
| SN-5040 | Dispersant | 0.6 |
| AM-1512 | Defoamer | 0.2 |
| DuPont R-902 | TiO$_2$ | 24.0 |
| CaCO$_3$ | filler | 15.0 |
| Let Down | | |
| AC-261 | Binder | 32.0 |
| Texanol | Coalescent | 2.5 |
| Thor EDW | Biocide | 0.2 |
| RM-2020 (50%) | Thickener | 2.5 |
| Water | | 6.8 |
| Total | | 100.00 |

TABLE III

Examples 4-7.

| Example | Aluminosilicate or Diatomaceous Earth | % CaCO$_3$ Replacement | Formaldehyde Purification Efficiency (Pass at ≥75%) | Toluene Purification Efficiency (Pass at ≥35%) | Durability of Formaldehyde Purification Efficiency (Pass at ≥60%) | Durability of Toluene Purification Efficiency (Pass at ≥20%) |
|---|---|---|---|---|---|---|
| 7 | Control Paint | 0% | 42% | 24% | 29% | 7% |
| 8 | Example 1 | 5% | 78% | 16% | 40% | 14% |
| 9 | Example 2 | 5% | 60% | 16% | 58% | 14% |
| 10 | Example 3 | 5% | 79% | 40% | 69% | 24% |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. Amorphous aluminosilicate particles having the following characteristics:
  (i) a BET surface area in a range from about 120 to about 450 m$^2$/g;
  (ii) an oil absorption of less than or equal to about 150 cc/100 g;
  (iii) a pore volume in a range from about 0.18 to about 0.6 cc/g; and
  (iv) a micropore volume of pores with pore diameters of less than 50 Å that is from about 10% to about 80% of the pore volume.

Embodiment 2. The particles defined in embodiment 1, wherein the BET surface area is in any range of BET surface areas disclosed herein, e.g., from about 120 to about 400, from about 125 to about 425, from about 125 to about 375 m$^2$/g, etc.

Embodiment 3. The particles defined in embodiment 1 or 2, wherein the oil absorption is in any range of oil absorption values disclosed herein, e.g., from about 30 to about 90, from about 50 to about 150, from about 50 to about 100 cc/100 g, etc.

Embodiment 4. The particles defined in any one of the preceding embodiments, wherein the pore volume is in any range of pore volumes disclosed herein, e.g., from about 0.2 to about 0.5, from about 0.18 to about 0.4, from about 0.2 to about 0.35 cc/g, etc.

Embodiment 5. The particles defined in any one of the preceding embodiments, wherein the micropore volume of pores with diameters of less than 50 Å is in any percentage range disclosed herein, e.g., from about 15% to about 70%, from about 15% to about 65%, from about 20% to about 60%, etc., based on the pore volume.

Embodiment 6. The particles defined in any one of the preceding embodiments, wherein the amorphous aluminosilicate particles are further characterized by a CTAB surface area in any range of CTAB surface areas disclosed herein, e.g., from about 30 to about 110, from about 35 to about 110, from about 45 to about 110 m$^2$/g, etc.

Embodiment 7. The particles defined in any one of embodiments 1-6, wherein the amorphous aluminosilicate particles comprise sodium aluminosilicate particles.

Embodiment 8. The particles defined in any one of embodiments 1-6, wherein the amorphous aluminosilicate particles comprise sodium magnesium aluminosilicate particles.

Embodiment 9. The particles defined in any one of the preceding embodiments, wherein the amorphous aluminosilicate particles are synthetic.

Embodiment 10. A composition comprising a liquid and the amorphous aluminosilicate particles defined in any one of embodiments 1-9.

Embodiment 11. A coating composition (e.g., a paint formulation) comprising a binder (or vehicle), a liquid (or diluent), and the amorphous aluminosilicate particles defined in any one of embodiments 1-9.

Embodiment 12. The composition defined in embodiment 11, wherein the composition passes a China JC/T 1074-2008 standard test for purification efficiency of formaldehyde at a level of ≥75%.

Embodiment 13. The composition defined in embodiment 11 or 12, wherein the composition passes a China JC/T 1074-2008 standard test for persistence of purification efficiency of formaldehyde at a level of ≥60%.

Embodiment 14. The composition defined in any one of embodiments 11-13, wherein the composition passes a China JC/T 1074-2008 standard test for purification efficiency of toluene at a level of ≥35%.

Embodiment 15. The composition defined in any one of embodiments 11-14, wherein the composition passes a China JC/T 1074-2008 standard test for persistence of purification efficiency of toluene at a level of ≥20%.

Embodiment 16. The composition defined in any one of embodiments 11-15, wherein the liquid comprises water.

Embodiment 17. The composition defined in any one of embodiments 11-16, wherein the binder comprises any suitable binder or any binder disclosed herein, e.g., latex resins (acrylic, vinyl acrylic, styreneated acrylic), polyurethane dispersions, solution polymer dispersions, etc., or combinations thereof.

Embodiment 18. The composition defined in any one of embodiments 11-17 wherein the composition further comprises TiO$_2$ and/or CaCO$_3$.

Embodiment 19. The composition defined in any one of embodiments 11-18, wherein the composition further comprises a colorant/pigment.

Embodiment 20. A dry coating produced from the (wet) composition defined in any one of embodiments 11-19.

Embodiment 21. A dry coating comprising the amorphous aluminosilicate particles defined in any one of the embodiments 1-9.

Embodiment 22. The coating defined in embodiment 20 or 21, wherein the coating passes a China JC/T 1074-2008 standard test for purification efficiency of formaldehyde at a level of ≥75%.

Embodiment 23. The coating defined any one of embodiments 20-22, wherein the coating passes a China JC/T 1074-2008 standard test for persistence of purification efficiency of formaldehyde at a level of ≥60%.

Embodiment 24. The coating defined in any one of embodiments 20-23, wherein the coating passes a China JC/T 1074-2008 standard test for purification efficiency of toluene at a level of ≥35%.

Embodiment 25. The coating defined in any one of embodiments 20-24, wherein the coating passes a China JC/T 1074-2008 standard test for persistence of purification efficiency of toluene at a level of ≥20%.

Embodiment 26. The coating defined in any one of embodiments 20-25, wherein the coating has any suitable thickness or a thickness in any range disclosed herein, e.g., from about 1 and about 500 μm, from about 5 to about 300 μm, from about 25 to about 250 μm, etc.

Embodiment 27. An article of manufacture comprising a substrate at least partially covered with the coating defined in any one of embodiments 20-26, wherein the substrate comprises any suitable substrate or any substrate disclosed herein, e.g., metal, concrete, wood, paper, plastic, etc., or combinations thereof.

Embodiment 28. An article of manufacture comprising a substrate at least partially covered with the aluminosilicate particles defined in any one of embodiments 1-9, wherein the substrate comprises any suitable substrate or any substrate disclosed herein, e.g., metal, concrete, wood, paper, plastic, etc., or combinations thereof.

Embodiment 29. The article defined in embodiment 27 or 28, wherein the article is any suitable article or any article disclosed herein, e.g., a filter fiber or air filter; a carpet fiber or carpet; a wall, floor, or ceiling of a building (e.g., an interior portion of a building); etc.

Embodiment 30. A method of coating a substrate, the method comprising:
(a) providing the coating composition defined in any one of embodiments 11-19;
(b) applying the composition to a surface of the substrate; and
(c) drying or curing the composition onto the substrate.

Embodiment 31. A method of removing VOC's from an air stream, the method comprising:
passing the air stream through a filter, the filter comprising fibers at least partially covered with the aluminosilicate particles defined in any one of embodiments 1-9 (or at least partially covered with the coating defined in any one of embodiments 20-26) under conditions sufficient for at least a portion of the VOC's to contact the fibers and be entrained by the filter, thereby removing VOC's from the air stream.

Embodiment 32. A method of removing VOC's from an indoor environment, the method comprising:
providing an interior surface at least partially covered with the coating (e.g., paint) defined in any one of embodiments 20-26; and
contacting the VOC's with the interior surface, wherein at least a portion of the VOC's in the indoor environment are absorbed by the coating.

We claim:

1. A method of removing VOC's from an indoor environment, the method consisting of:
providing an interior surface at least partially covered with a coating consisting of amorphous sodium aluminosilicate particles, and optionally one or more of, a binder, a liquid, a colorant/pigment, rheology modifiers, surfactants, defoamers, coalescents, and biocides, the amorphous sodium aluminosilicate particles characterized by:
(i) a BET surface area in a range from about 120 to about 450 m$^2$/g;
(ii) an oil absorption of less than or equal to about 150 cc/100 g;
(iii) a pore volume in a range from about 0.18 to about 0.6 cc/g; and
(iv) a micropore volume of pores with pore diameters of less than 50 Å that is from about 10% to about 80% of the pore volume; and
(v) a molar ratio of silica to alumina greater than 1.0.
contacting the VOC's with the interior surface, wherein at least a portion of the VOC's in the indoor environment are absorbed by the coating.

2. The method of claim 1, wherein the amorphous sodium aluminosilicate particles are further characterized by:
a BET surface area in a range from about 120 to about 400 m$^2$/g;
an oil absorption in a range from about 50 to about 150 cc/100 g;
a pore volume in a range from about 0.2 to about 0.5 cc/g; and
a micropore volume from about 15% to about 75% of the pore volume.

3. The method of claim 1, wherein the amorphous sodium aluminosilicate particles are further characterized by a CTAB surface area in a range from about 30 to about 110 m$^2$/g.

4. The method of claim 1, wherein the amorphous sodium aluminosilicate particles are further characterized by:
a CTAB surface area in a range from about 40 to about 105 m$^2$/g; and
a micropore volume from about 20% to about 60% of the pore volume.

5. The method of claim 1, wherein the coating has a thickness in a range from about 5 to about 300 μm.

6. The method of claim 1, wherein:
the coating passes a China JC/T 1074-2008 standard test for purification efficiency of formaldehyde at a level of ≥75%; and
the coating passes a China JC/T 1074-2008 standard test for persistence of purification efficiency of formaldehyde at a level of ≥60%.

7. The method of claim 1, wherein:
the coating passes a China JC/T 1074-2008 standard test for purification efficiency of toluene at a level of ≥35%; and
the coating passes a China JC/T 1074-2008 standard test for persistence of purification efficiency of toluene at a level of ≥20%.

8. A method of removing VOC's from an air stream, the method consisting of:
passing the air stream through a filter, the filter consisting of fibers at least partially covered with amorphous sodium aluminosilicate particles, under conditions sufficient for at least a portion of the VOC's to contact the fibers and be entrained by the filter, thereby removing VOC's from the air stream;
wherein the amorphous sodium aluminosilicate particles are characterized by:
(i) a BET surface area in a range from about 120 to about 450 m$^2$/g;
(ii) an oil absorption of less than or equal to about 150 cc/100 g;
(iii) a pore volume in a range from about 0.18 to about 0.6 cc/g; and (iv) a micropore volume of pores with pore diameters of less than 50 Å that is from about 10% to about 80% of the pore volume; and (v) a molar ratio of silica to alumina greater than 1.0.

9. The method of claim 8, wherein the amorphous sodium aluminosilicate particles are further characterized by:

a BET surface area in a range from about 120 to about 400 m$^2$/g;

an oil absorption in a range from about 50 to about 150 cc/100 g;

a pore volume in a range from about 0.2 to about 0.5 cc/g; and a micropore volume from about 15% to about 75% of the pore volume.

10. The method of claim 8, wherein the amorphous sodium aluminosilicate particles are further characterized by a CTAB surface area in a range from about 30 to about 110 m$^2$/g.

11. The method of claim 8, wherein the amorphous sodium aluminosilicate particles are further characterized by a micropore volume from about 20% to about 60% of the pore volume.

12. The method of claim 8, wherein the amorphous sodium aluminosilicate particles are further characterized by a CTAB surface area in a range from about 40 to about 105 m$^2$/g.

13. The method of claim 8, wherein the amorphous sodium aluminosilicate particles are further characterized by an oil absorption in a range from about 45 to about 85 cc/100 g.

14. The method of claim 8, wherein:

the filter passes a China JC/T 1074-2008 standard test for purification efficiency of formaldehyde at a level of ≥75%; and the filter passes a China JC/T 1074-2008 standard test for persistence of purification efficiency of formaldehyde at a level of ≥60%.

15. The method of claim 8, wherein:

the filter passes a China JC/T 1074-2008 standard test for purification efficiency of toluene at a level of ≥35%; and the filter passes a China JC/T 1074-2008 standard test for persistence of purification efficiency of toluene at a level of ≥20%.

* * * * *

UNITED STATES PATENT AND TRADEMARK OFFICE
CERTIFICATE OF CORRECTION

PATENT NO. : 10,589,210 B2
APPLICATION NO. : 15/538915
DATED : March 17, 2020
INVENTOR(S) : Zhou et al.

It is certified that error appears in the above-identified patent and that said Letters Patent is hereby corrected as shown below:

In the Claims

Column 13, Line 57-Column 14, Line 13, (approx.), should read:
A method of removing VOC's from an indoor environment, the method consisting of:
providing an interior surface at least partially covered with a coating consisting of amorphous sodium aluminosilicate particles, and optionally one or more of, a binder, a liquid, a colorant/pigment, rheology modifiers, surfactants, defoamers, coalescents, and biocides, the amorphous sodium aluminosilicate particles characterized by:
(i) a BET surface area in a range from about 120 to about 450 m2/g;
(ii) an oil absorption of less than or equal to about 150 cc/100g;
(iii) a pore volume in a range from about 0.18 to about 0.6 cc/g;
(iv) a micropore volume of pores with pore diameters of less than 50 Å that is from about 10% to about 80% of the pore volume; and
(v) a molar ratio of silica to alumina greater than 1.0; and contacting the VOC's with the interior surface, wherein at least a portion of the VOC's in the indoor environment are absorbed by the coating.

Signed and Sealed this
Twelfth Day of May, 2020

Andrei Iancu
*Director of the United States Patent and Trademark Office*